Patented Oct. 3, 1939

2,174,545

UNITED STATES PATENT OFFICE 2,174,545

POLYVINYL HALIDE COMPOSITIONS

Claude H. Alexander, Cuyahoga Falls, Ohio, assignor to The B. F. Goodrich Company, New York, N. Y., a corporation of New York No Drawing. Application April 1, 1938, Serial No. 199,435

5 Claims. (Cl. 260—88)

This invention relates to polyvinyl halides, and has as its principal object to provide stable polyvinyl halide compositions.

Polyvinyl halides have found many useful applications because of their extraordinary resistance to oxidation, organic solvents, acids, alkalies, and other deteriorating influences. Compositions containing polyvinyl halides, however, have frequently tended to discolor during the heat treatment required for molding them or after exposure to natural or artificial light for periods of time, which darkening was apparently caused by some fundamental change in the composition. Solutions of polyvinyl halides have also had a tendency to gell irreversibly in the presence of metals or metallic halides. They were particularly susceptible to the presence of iron, as little as .005% often causing gelling, particularly when the solution was heated.

By the method of this invention, compositions are produced which have greatly increased resistance to heat and light, and which remain unchanged in solution for considerable periods of time, even in the presence of metals. These beneficial results are obtained by incorporating in the polyvinyl halide a silicate of an alkali metal. Any type of polyvinyl halide such as alpha, beta, delta, and gamma polyvinyl chloride, polyvinyl bromide, or even polyvinyl halide compositions formed by the conjoint polymerization of a vinyl halide such as vinyl chloride and a vinyl ester of an aliphatic acid such as vinyl acetate may be stabilized with the materials of this invention. Since the plasticized gamma polyvinyl chlorides described in U. S. Patent No. 1,929,453 issued to Waldo L. Semon show the greatest commercial promise, the invention will be described in detail with reference to these materials, though it is to be understood that the invention is equally applicable to other polyvinyl halides as set forth above.

The stabilizer may consist of any silicate of an alkali metal such as sodium, potassium, or lithium. Since the sodium silicates are inexpensive and commercially available, they are usually employed. Any of the various sodium silicates may be used in an anhydrous or hydrous solid form or in a concentrated aqueous solution such as ordinary water glass.

The stabilizer may be added at any time during the polymerization of the vinyl chloride or the plasticization of the same, though it is preferably added before the composition is heat molded. A small proportion of pulverized crystalline sodium silicate, from 1 to 10% for instance, may be incorporated in a composition comprising gamma polyvinyl chloride 57 parts and tricresyl phosphate 43 parts on a hot mixing mill at about 200° F. When water glass is added to the composition on a hot mill, the water is driven off and the sodium silicate is uniformly deposited in a finely divided form throughout the mixture. The resulting composition has a lighter color after heat molding than similar compositions containing no stabilizer.

In another embodiment, a plasticized gamma polyvinyl chloride composition is dissolved at an elevated temperature in a suitable solvent such as mesityl oxide or chlorotoluene, and the pulverized silicate is stirred into the solution. This hot solution will keep for weeks, without gelling or darkening, even in the presence of small amounts of metals or metallic halides. The films formed by dipping articles in this solution and driving off the solvent are also more resistant to discoloration by heat and light than unstabilized compositions.

The compositions of this invention may contain, besides the stabilizer, carbon black, zinc oxide, barytes, clay, wood flour, and other pigments and fillers commonly used in the rubber and plastics industries. The polyvinyl halides may also contain appreciable amounts of other polymers such as polyvinyl organic esters either conjointly polymerized therewith or incorporated therein after polymerization.

While I have herein disclosed specific embodiments of my invention, I do not intend to limit the invention solely thereto, for it is obvious that many modifications including substituting equivalent materials and varying the proportions of materials used are within the spirit and scope of the invention as defined in the appended claims.

I claim:

1. The method of stabilizing plasticized gamma polyvinyl chloride which comprises incorporating water glass therein on a hot mill and milling until the water has evaporated.

2. A polyvinyl halide containing a silicate of an alkali metal.

3. A polyvinyl chloride containing a silicate of an alkali metal.

4. Plasticized gamma polyvinyl chloride containing sodium silicate.

5. A solution of plasticized gamma polyvinyl chloride containing sodium silicate.

CLAUDE H. ALEXANDER.